United States Patent
Da Palma et al.

(10) Patent No.: US 7,349,836 B2
(45) Date of Patent: Mar. 25, 2008

(54) METHOD AND PROCESS TO GENERATE REAL TIME INPUT/OUTPUT IN A VOICE XML RUN-TIME SIMULATION ENVIRONMENT

(75) Inventors: William V. Da Palma, Coconut Creek, FL (US); Brett J. Gavagni, Coconut Creek, FL (US); Matthew W. Hartley, Boynton Beach, FL (US); Brien H. Muschett, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 824 days.

(21) Appl. No.: 10/734,486

(22) Filed: Dec. 12, 2003

(65) Prior Publication Data

US 2005/0131707 A1    Jun. 16, 2005

(51) Int. Cl.
   *G06F 9/45* (2006.01)
   *H04M 11/00* (2006.01)
   *G10L 13/00* (2006.01)
(52) U.S. Cl. ............... 703/22; 379/88.18; 704/260; 704/270
(58) Field of Classification Search ............... 704/258, 704/260, 267, 270, 275, 276; 703/21, 22; 379/88.16, 88.18
   See application file for complete search history.

(56) References Cited

U.S. PATENT DOCUMENTS

| | | | |
|---|---|---|---|
| 3,840,708 A | | 10/1974 | Clark |
| 4,093,831 A | * | 6/1978 | Sharp et al. ............. 369/47.55 |
| 5,220,658 A | * | 6/1993 | Kerr et al. ................... 703/22 |
| 5,475,792 A | | 12/1995 | Stanford et al. |
| 5,652,828 A | * | 7/1997 | Silverman .................. 704/260 |
| 5,758,318 A | * | 5/1998 | Kojima et al. .............. 704/251 |
| 5,832,441 A | | 11/1998 | Aaron et al. |
| 6,113,645 A | * | 9/2000 | Benitz et al. ................. 703/22 |
| 6,178,395 B1 | * | 1/2001 | Gee ............................ 703/22 |
| 6,308,146 B1 | * | 10/2001 | La Cascia et al. ........... 703/22 |
| 6,321,198 B1 | * | 11/2001 | Hank et al. ................. 704/270 |
| 6,405,170 B1 | * | 6/2002 | Phillips et al. ............. 704/270 |
| 6,502,070 B1 | | 12/2002 | Boies et al. |
| 6,510,411 B1 | * | 1/2003 | Norton et al. .............. 704/254 |
| 6,513,009 B1 | * | 1/2003 | Comerford et al. ......... 704/270 |
| 6,526,382 B1 | * | 2/2003 | Yuschik ..................... 704/275 |
| 6,578,000 B1 | | 6/2003 | Dodrill et al. |

(Continued)

*Primary Examiner*—Patrick N. Edouard
*Assistant Examiner*—Joel Stoffregen
(74) *Attorney, Agent, or Firm*—Richard A. Tomlin, Esq.; Steven M. Greenberg, Esq.; Carey Rodriguez Greenberg & Paul LLP

(57) ABSTRACT

A method and system for testing voice applications, such as VoiceXML applications, is provided. The system provides a run-time simulation environment for voice applications that simulates and automates user interaction. A user simulation script is provided in a customized mark-up language. The voice application is processed to derive a nominal output of the voice application. The user simulation script is processed to generate a simulated output for the voice application corresponding to the nominal output. The user simulation script is also processed to generate a simulated input for the voice application corresponding to a pre-determined user input to the voice application. The simulated inputs and outputs are executed in conjunction with the voice application in real-time to test the application. Execution time rates for text based input and output are calculated based on empirical speaking rates of human users.

6 Claims, 3 Drawing Sheets

U.S. PATENT DOCUMENTS 6,823,054 B1 * 11/2004 Suhm et al. ................. 379/134
6,823,313 B1 * 11/2004 Yuchimiuk et al. ......... 704/275
7,024,348 B1 *  4/2006 Scholz et al. ................. 703/24
7,117,158 B2 * 10/2006 Weldon et al. ............... 704/270
7,133,830 B1 * 11/2006 Hoban et al. ............. 704/270.1
7,139,369 B2 * 11/2006 Martin et al. ............. 379/88.16
7,162,406 B1 *  1/2007 Dye ............................ 703/21

* cited by examiner

METHOD AND PROCESS TO GENERATE REAL TIME INPUT/OUTPUT IN A VOICE XML RUN-TIME SIMULATION ENVIRONMENT

BACKGROUND OF THE INVENTION

1. Statement of the Technical Field

The present invention relates to the field of computer speech recognition, text-to-speech technology and telephony, and more particularly to a system and method for a run-time simulation environment for voice applications that simulates and automates user interaction.

2. Description of the Related Art

Functionally testing voice applications presents many difficulties. In the case of a VoiceXML (VXML) application, a VXML interpreter communicates with a platform that supplies the necessary speech technology needed to test the application in real-time. These speech technologies, such as an automatic speech recognition (ASR) engine, or a text-to-speech (TTS) engine or converter, are generally very CPU intensive and expensive to build and install. In addition to the speech technologies, to test a voice application a tester must also provided the input to the application. This usually requires a tester to physically perform the interaction, in the form of actual speech or key tone input, which may be cumbersome and difficult to provide. Having a person perform the input can be time consuming and costly.

It will be recognized by a skilled artisan that when testing a voice application, it can be difficult to mimic the true behavior of speech or audio input to the application, as well as any text-to-speech or pre-recorded audio output from the application. This is because voice applications are used in a run-time environment, and are therefore very "time-oriented." A user is generally required to supply an input to the application within a certain amount of time or else a "speech timeout" may occur. Thus, the interaction between the user and the voice application depends upon the relative rates at which the inputs and outputs are made to and from the voice application.

It would be desirable therefore to provide a testing environment that allows the simulation of user interaction as well as the simulation of the speech technology platform, such that a developer of voice applications will no longer be dependent on human testers and speech technology and hardware to test their applications. The testing environment would therefore be a "simulation environment" that would adequately replace the user and speech technologies. It would further be desirable to provide a simulation environment that simulated the actual rates of execution of a user interaction with the voice application, as if real input and output were occurring. A system and method is therefore needed to simulate that real-time execution.

SUMMARY OF THE INVENTION

The present invention provides a simulation environment that simulates the real-time interaction between a user and a voice application. A simulation script is coupled to a voice application such that the script provides both simulated inputs to the application and simulated outputs from the application. The simulation script is further configured calculate the actual execution times for the inputs and outputs to and from the voice application, which are calculated based on actual speaking rates for users.

Methods consistent with the present invention provide a method for simulating a run-time user interaction with a voice application. A user simulation script programmed to specify simulated voice interactions with the voice application is loaded. The voice application is processed to derive a nominal output of the voice application. The nominal output includes a text stream. The user simulation script is processed to generate a simulated output for the voice application corresponding to the nominal output. An execution time is calculated for the simulated output. The execution time is equal to a length of the text stream divided by an empirical speaking rate of a user. The simulated output is then executed at its calculated execution time in conjunction with the voice application.

Another method includes a method for simulating a run-time user interaction with a voice application. Again, a user simulation script programmed to specify simulated voice interactions with the voice application is loaded. The voice application is processed to derive a nominal output of the voice application. In this case, the nominal output includes an audio stream. The user simulation script is also processed to generate a simulated output for the voice application corresponding to the nominal output. An execution time is calculated for the simulated output based on a sampling rate and a number of samples associated with the audio stream. The simulated output is executed at its calculated execution time in conjunction with the voice application.

Systems consistent with the present invention include a simulation tool for simulating a run-time user interaction with a voice application running on an application server. The tool is configured to load a user simulation script programmed to specify simulated voice interactions with the voice application. The tool is also configured to: (i) process the voice application to derive a nominal output of the voice application, the nominal output including a text stream; (ii) process the user simulation script to generate a simulated output for the voice application corresponding to the nominal output; (iii) calculate an execution time for the simulated output, said execution time being equal to a length of the text stream divided by an empirical speaking rate of a user; and (iv) execute the simulated output at its calculated execution time in conjunction with the voice application.

Another system includes a simulation tool for simulating a run-time user interaction with a voice application running on an application server. This tool is also configured to load a user simulation script programmed to specify simulated voice interactions with the voice application. However, in this case, the tool is also configured to: (i) process the voice application to derive a nominal output of the voice application, the nominal output including an audio stream; (ii) process the user simulation script to generate a simulated output for the voice application corresponding to the nominal output; (iii) calculate an execution time for the simulated output based on a sampling rate and a number of samples associated with the audio stream; and (iv) execute the simulated output at its calculated execution time in conjunction with the voice application.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

Figure 1:
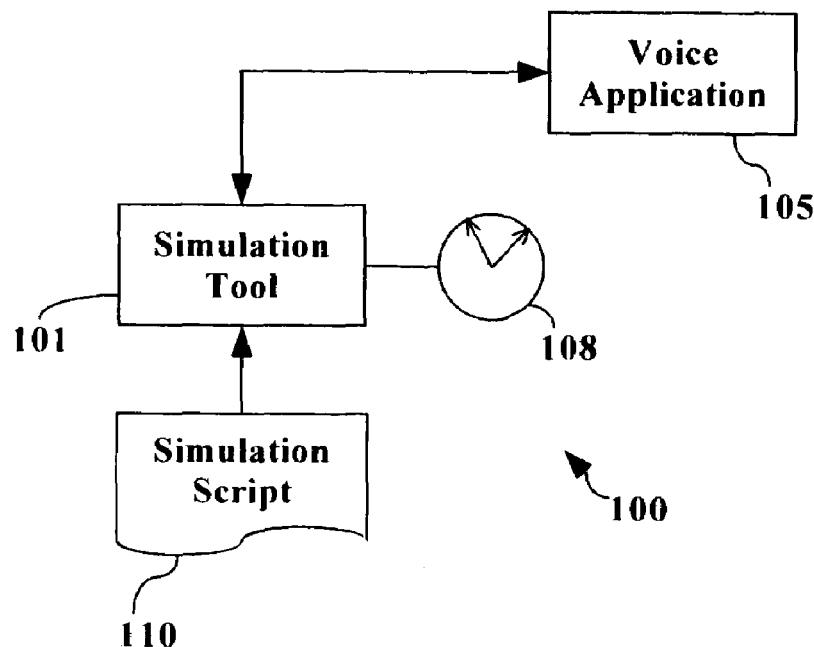
FIG. 1 is a conceptual drawing of the present invention which provides a user interaction simulation environment for a voice application.

The present invention is a system and method for simulating a run-time user interaction with a voice application. FIG. 1 is a conceptual drawing of the general concept of the present invention. In accordance with the present invention, a user interaction simulation environment for a voice application can be provided. The simulation environment 100 of the present invention can include a simulation tool 101 coupled to a voice application 105. More specifically, the simulation tool 101 can use both a set of timing rules 108 and also a simulation script 110 to specify inputs and outputs to and from the voice application, to simulate real-time interactions by a user with the voice application.

Notably, by comparison to the manual testing methodologies of the prior art, the simulation tool 101 and script 110 replace the actual inputs that may be provided by a live user, as well as the actual outputs that may be provided by the voice application 101. Moreover, the timing rules 108 can provide a set of conventions for calculating the rates at which the simulated inputs and outputs to and from the voice application 105 are provided by the simulation tool 101.

As used herein, a "voice application" shall mean any logic permitting user interaction through a voice driven user interface, such as a mark-up language specification for voice interaction with some form of coupled computing logic. One example of a voice application is an application written in Voice Extensible Mark-up Language, or "VoiceXML." However, it is readily understood that VoiceXML applications are not the only type of voice applications, and any reference to the term "VoiceXML application" herein shall encompass all voice applications.

In conventional voice systems, the voice application itself receives the "outputs" it generates to users from various speech technologies coupled to the voice application. For example, the voice application can receive an input from the user, and can record the input with an audio device, or convert the spoken word input into text using an automatic speech recognition engine. The voice application can then playback the recorded audio to the user as a prompt, or may convert a text stream to audio using the text-to-speech capabilities of a speech technologies platform, either of which may be sent as another "output" to the user.

Heretofore, to test a voice application, all of the foregoing speech processing elements are needed. The present invention replaces a number of those elements, by providing a simulation environment that allows a voice application to be executed in real-time, and that supplies and simulates the execution time of the inputs and outputs that flow to and from the voice application. This provides for a realistic, cost-effective testing environment that will greatly increase the ease and efficacy of developing voice applications.

Figure 2:
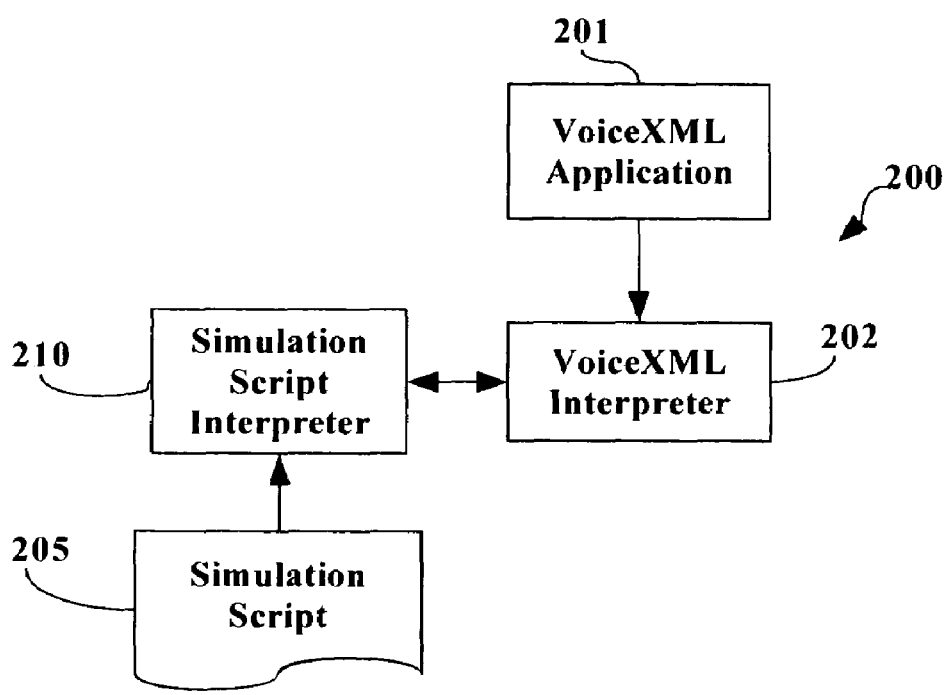
FIG. 2 is a block diagram showing the arrangement of elements in a system assembled in accordance with the principles of the present invention for simulating a run-time environment with a voice application.

To further illustrate the operation of the present invention, FIG. 2 is a block diagram showing the arrangement of elements in a system 200 assembled in accordance with the principles of the present invention for simulating a run-time environment with a voice application. The system 200 can include a VoiceXML Application 201 (which may running on an application server) that can be interpreted by an interpreter 202. The system 200 can also include a simulation script 205 that can be interpreted by a second interpreter 210. The second interpreter 210 may reside on a separate piece of hardware, or may be resident on the same hardware as the voice application 201 and interpreter 202.

The simulation environment 200 can process customized mark-up language documents which describe the user interaction or the user experience with the environment itself. Specifically, the mark-up language documents describe the set of operations a user might take as a transcript of what occurs when interacting with the voice application. In this regard, what is the desired to be simulated is the behavior between the user and the voice application, which is provided by the simulation script 205 written in the customized mark-up language, which, by way of non-limiting example, may be called a "Voice User Interaction Extensible Mark-up Language," or "VuiXML." The user behavior, as well as the prompts and outputs supplied from the voice application itself, is mimicked and embodied in the user simulation script 205.

The user simulation script 205 can be a script that describes how the user interacts with the system. Common interaction behaviors can include voice response, input in the form of digits, pauses between spoken words, hang-up operations, typical inputs that a user would make when interacting with a voice response system. This user interaction is embodied in the script 205.

In addition to the script 205, an interpreter 210 can be included. The interpreter 210 processes the simulation script 205 and interacts with the VoiceXML interpreter 202. The interaction between the script 205 and VoiceXML application 201 uses only text-based results, and dispenses with the need for actual human or machine-generated audio input or output. There is however, a pre-cognition of what the user is going to do. The script 205 is all pre-developed. But the script 205 flows in real-time and describes what a user is doing sequentially, and supplies the outputs and prompts from a voice application in real-time, so as the better test and develop the application.

Figure 3:
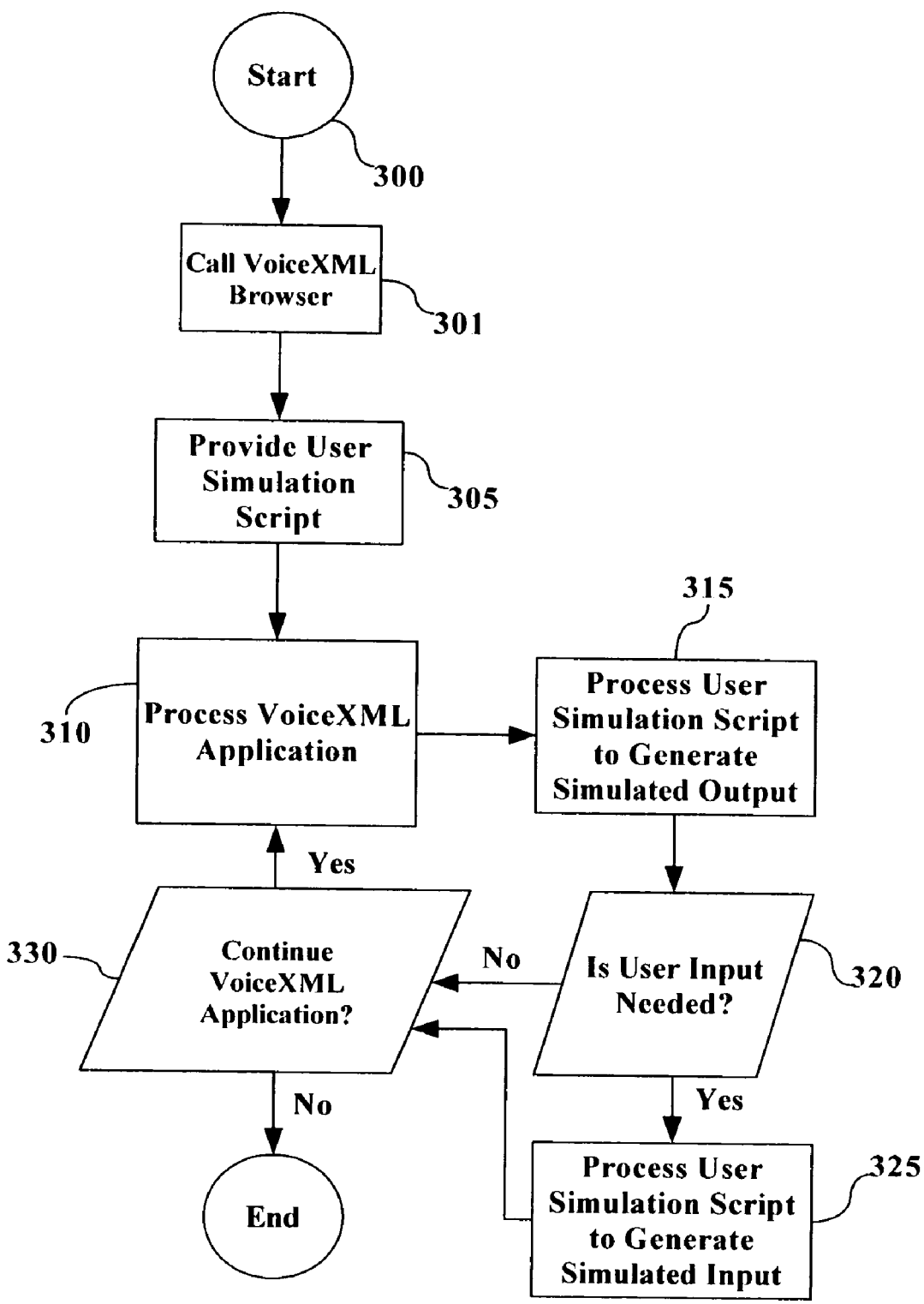
FIG. 3 is a flowchart illustrating a process for simulating a run-time user interaction with a voice application.

FIG. 3 is a flowchart illustrating a process for simulating a run-time user interaction with a voice application. Beginning in block 301, the voice application browser, such as a VoiceXML browser, can be called to operation. In block 305, a user simulation script can be provided and supplied to the simulation environment. Subsequently, in block 310, the voice application can be processed.

A conventional voice application normally generates one or more outputs, which can include prompts, synthesized text to speech, pre-recorded audio, and the like. However, in the simulation environment of the present invention, all such outputs are text based, and are initially "nominal" outputs:

the outputs that the voice application would otherwise provide to a user in the non-simulated environment. Within the simulation environment, the actual outputs for the voice application are instead generated by the user simulation script, which, in block 315, generates a simulated output for the voice application corresponding to the nominal output.

In block 320, it next can be determined whether the voice application requires a user input. Should the voice application require a user input, the user simulation script is processed in step 325 to generate a simulated input for the voice application corresponding to a pre-determined user input to the voice application. As stated above, all such input is pre-developed and supplied in the user script. The process may then choose to continue after assessing whether additional processing of the voice application is necessary in step 330, or may terminate if execution of the voice application is complete.

Figure 4:
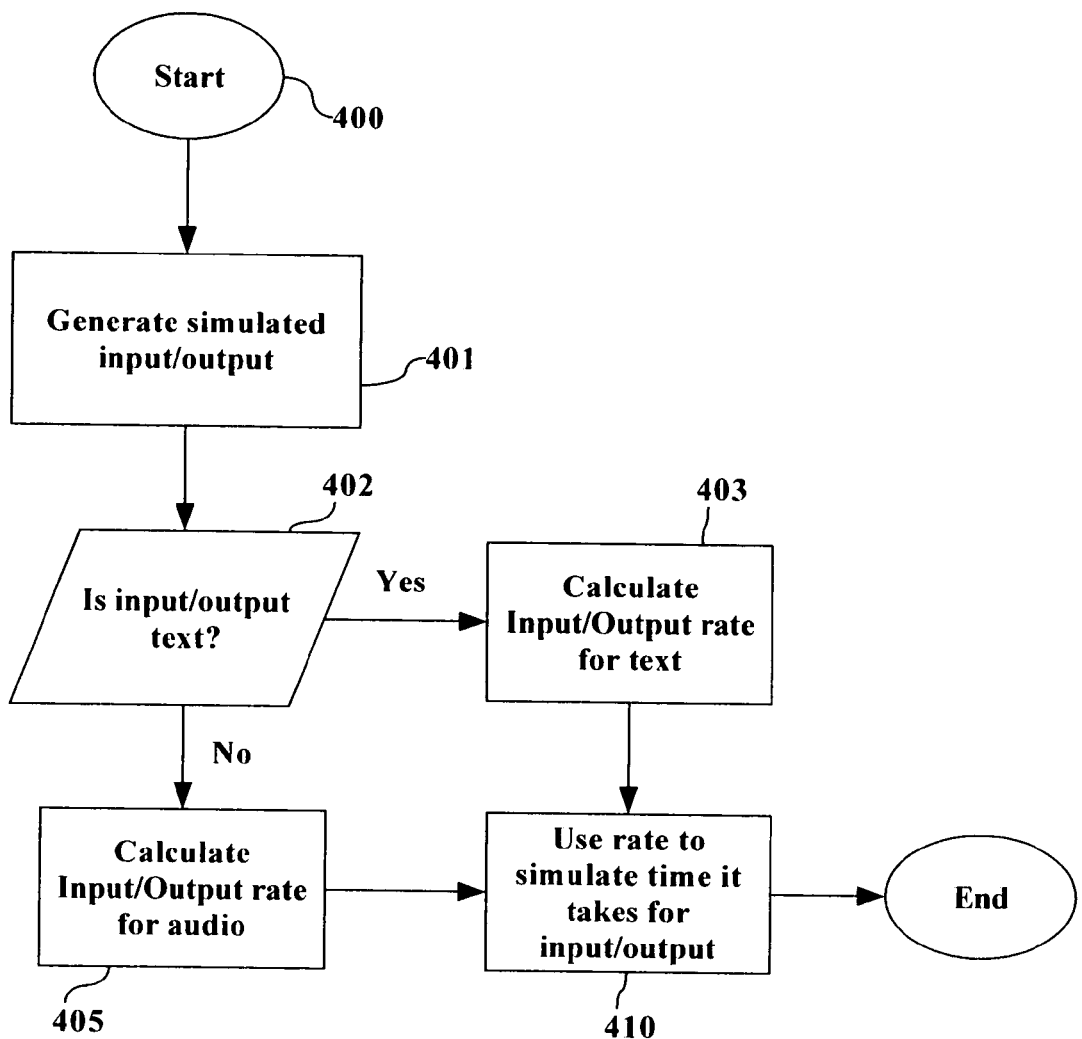
FIG. 4 is a flowchart illustrating a process for determining the execution time of simulated input and output provided by the simulation environment of the present invention.

To provide an accurate run-time simulation environment, the present invention must simulate the actual rates at which user input into, or output from, the voice application is executed. FIG. 4 is a flowchart illustrating a process for determining the execution time of simulated input and output provided by the simulation environment of the present invention. In step 401, the system generates simulated input or output by processing user simulation script. However, the simulation is not yet executed. The rate at which the input or output is simulated is first calculated. These rates are provided by a set of conventions or rules for calculating the rates, as embodied by the timing rules 108 in FIG. 1.

The input or output can be a simulation of text based material, or audio material. For example, a voice application can prompt a user using synthesized text-to-speech streams that convert text based output to an audible output. This would be a nominal text-based output. Or, the voice application could directly output an audio stream, such as a pre-recorded message. The simulation environment handles both types when simulating either input or output.

At step 402, the system determines whether the simulated input or output is based on a text stream, or based on an audio file. The audio file can be one or more audio streams that would be included in the nominal output of the voice application. If text-based, the simulated input/output rate is calculated in step 403 for text. If audio, the simulated input/output rate is calculated in step 405. Once the rate is calculated, the execution time it takes to execute the input or output, in conjunction with the flow of events dictated by the execution of the voice application script, is simulated by executing the user simulation script. This would be analogous to either step 315 or step 325 in the general simulation process shown in FIG. 3.

In step 403, the rate of input or output to be executed can be calculated using the actual speaking rates of a human being, so as to more effectively simulate the execution time of such input/output in the simulation environment. These human speaking rates can be based on empirically or statistically derived rates, which may vary from one language to another. By way of non-limiting example, the speaking rate for the English language may be set at 70 words per minute. Therefore, the output "Your current account balance is . . . " would entail five words spoken at 70 words per minute, which amounts to 5/70=0.07 min=4.3 sec. The user simulation script would therefore simulate this text output to take 4.3 seconds to execute. Thus, the execution time for any text based simulated input or output would be equal to a length of the text stream divided by an empirical speaking rate of a user, where the "length" as used herein can be defined as the number of words in a text stream, or any metric which may be divided by time to express the speaking rate of a user.

In step 405, the simulated input and output rates are determined not by empirical speaking rates of a user, but by the actual sampling rate and a number of samples associated with the audio stream that is included in the nominal output of, or the pre-determined user input into, the voice application that is being simulated. This information is generally included with the audio stream itself, and can be extracted therefrom to provide the run-time simulation.

The advantage and utility of the present invention is that the simulation script 205 generates simulated outputs and inputs in real-time, and not only provides the simulated text of the nominal outputs and user inputs to a voice application, but provides them at a time rate which closely mimics a run-time interaction.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for simulating a run-time user interaction with a voice application, said method comprising the steps of:

loading a user simulation script programmed to specify simulated voice interactions with the voice application;

deriving from the voice application a nominal output, the nominal output including a text stream;

processing the user simulation script to generate a simulated output for the voice application corresponding to the nominal output;

calculating an execution time for the simulated output, the execution time being equal to a length of the text stream divided by an empirical speaking rate of a user; and executing the simulated output at its calculated execution time in conjunction with the voice application.

2. The method of claim 1, further comprising the steps of:
- processing the user simulation script to generate a simulated input for the voice application, the simulated input including a text equivalent of a pre-determined user input;
- calculating an execution time for the simulated input, said execution time being equal to a length of the text equivalent of the pre-determined user input divided by the empirical speaking rate of a user; and
- executing the simulated input at its calculated execution time in conjunction with the voice application.

3. A machine readable storage having stored thereon a computer program for simulating a run-time user interaction with a voice application, said computer program comprising a routine set of instructions which when executed by a machine cause the machine to perform the steps of:
- loading a user simulation script programmed to specify simulated voice interactions with the voice application;
- deriving from the voice application a nominal output, the nominal output including a text stream;
- processing the user simulation script to generate a simulated output for the voice application corresponding to the nominal output;
- calculating an execution time for the simulated output, the execution time being equal to a length of the text stream divided by an empirical speaking rate of a user; and
- executing the simulated output at its calculated execution time in conjunction with the voice application.

4. The machine readable storage of claim 3, further causing said machine to perform the steps of:
- processing the user simulation script to generate a simulated input for the voice application, the simulated input including a text equivalent of a pre-determined user input;
- calculating an execution time for the simulated input, said execution time being equal to a length of the text equivalent of the pre-determined user input divided by the empirical speaking rate of a user; and
- executing the simulated input at its calculated execution time in conjunction with the voice application.

5. A simulation tool for simulating a run-time user interaction with a voice application running on an application server, said tool being configured to load a user simulation script programmed to specify simulated voice interactions with the voice application, and to:
- (i) first process the voice application to derive a nominal output of the voice application, the nominal output including a text stream;
- (ii) second process the user simulation script to generate a simulated output for the voice application corresponding to the nominal output;
- (iii) calculate an execution time for the simulated output, said execution time being equal to a length of the text stream divided by an empirical speaking rate of a user; and
- (iv) execute the simulated output at its calculated execution time in conjunction with the voice application.

6. The simulation tool of claim 5, wherein the tool is further configured to:
- (i) process the user simulation script to generate a simulated input for the voice application, the simulated input including a text equivalent of a pre-determined user input;
- (ii) calculate an execution time for the simulated input, said execution time being equal to a length of the text equivalent of the pre-determined user input divided by the empirical speaking rate of a user; and
- (iii) execute the simulated input at its calculated execution time in conjunction with the voice application.

* * * * *